March 12, 1968  R. L. EVERY  3,373,093
METHOD OF FORMING AN OXIDE COATING ON METALS
Filed March 2, 1966  4 Sheets-Sheet 1

INVENTOR.
RICHARD L. EVERY
BY
Henry H. Huth
ATTORNEY

March 12, 1968     R. L. EVERY     3,373,093
METHOD OF FORMING AN OXIDE COATING ON METALS
Filed March 2, 1966     4 Sheets-Sheet 2

INVENTOR.
RICHARD L. EVERY
BY
*Henry H. Huth*
ATTORNEY

March 12, 1968

R. L. EVERY 3,373,093

METHOD OF FORMING AN OXIDE COATING ON METALS

Filed March 2, 1966

INVENTOR.
RICHARD L. EVERY

BY *Henry H. Huth*

ATTORNEY

March 12, 1968  R. L. EVERY  3,373,093
METHOD OF FORMING AN OXIDE COATING ON METALS
Filed March 2, 1966  4 Sheets-Sheet 4

INVENTOR.
RICHARD L. EVERY
BY *Henry H. Huth*
ATTORNEY

United States Patent Office 3,373,093
Patented Mar. 12, 1968

3,373,093
METHOD OF FORMING AN OXIDE COATING ON METALS
Richard L. Every, Ponca City, Okla., assignor to Continental Oil Company, Ponca City, Okla., a corporation of Delaware
Continuation-in-part of application Ser. No. 368,956, May 20, 1964. This application Mar. 2, 1966, Ser. No. 531,261
2 Claims. (Cl. 204—39)

This application is a continuation-in-part of application for United States Letters Patent Ser. No. 368,956, filed May 20, 1964, now abandoned, which was a continuation-in-part of application for United States Letters Patent Ser. No. 260,804, filed Feb. 25, 1963, now abandoned. The invention relates to a method of putting an oxide coating on a metal. This invention also relates to a method of making metal-metal oxide electrodes. The electrodes produced by this method are useful as reference electrodes in the determination of the susceptibility of a metal to attack by corrosive electrolytic solutions. Such methods of determining the susceptibility of a metal to attack by corrosive electrolyte solution form the subject matter of my co-pending application No. 368,956 mentioned above.

In the anodic polarization systems known to me to be in commercial use at the present time, two types of electrochemical half-cells are generally employed as the reference electrode. Of these the most frequently used is the calomel half-cell, an electrode accepted as a standard and widely used in other applications by virtue of its relatively stable and constant potential. The other reference electrode which is used in the anodic polarization corrosion system is a silver-silver chloride electrode. The calomel electrode is a liquid electrode while the silver-silver chloride electrode is solid.

Although corrosion control systems employing these two types of reference electrodes to determine corrosion susceptibility have generally worked satisfactorily under certain preselected conditions, these electrodes lack universality with respect to the types of electrolytes in which they may be used; and each suffers from serious limitations when subjected to variations in the concentration of the electrolyte in which it is used or to varying temperature conditions.

The silver-silver chloride half-cell is rather difficult to prepare properly and because of its softness, presents some difficulty in mounting. The most serious shortcomings of this reference electrode, however, are its solubility in oleum, a frequently encountered electrolyte in such corrosion protection systems, and its susceptibility to severe erosion in highly agitated systems.

Although the calomel electrode is of more universal utility than the silver-silver chloride electrode, in several respects it presents serious disadvantages not shared by the silver-silver chloride electrode. For the most part, these stem from the fact that it is a liquid electrode; thus to prevent contamination of the electrode, a suitable electrochemical salt bridge must be utilized to provide a conductive path between the corrosive electrolyte and the calomel electrode. Not only are reference electrode assemblies employing such salt bridges difficult to install but they also present a problem of contamination of the electrolyte product by the salt solution of the bridge; moreover, where large tanks filled with a corrosive electrolytic chemical are to be protected, the salt bridge must be of considerable length; and for this reason, it is rather fragile and is, therefore, subject to mechanical malfunction particularly in systems in which the corrosive electrolyte is violently agitated. Also, in product storage systems where the corrosive electrolyte is maintained under pressure, some means must be provided for equalizing the pressure acting upon the salt solution and the electrolytic bridge.

The ideal reference electrode for use in determining susceptibility of corrosive attack must possess certain characteristics. The properties of the ideal reference electrode for use in anodic polarization corrosion control systems may be summarized as follows:

(a) Insolubility in any electrolyte in which it may be used and in any concentration of such electrolyte;

(b) That it exhibit an electrical potential which is essentially independent of electrolyte concentration and temperature;

(c) That it does not require use of an electrolytic salt bridge; and (d) That it can be fabricated in the form of a durable structure which will resist erosion, abrasion and impact.

In addition to the use as electrodes of metal-metal oxides prepared by this method, other uses have been found for the oxide coated metals. Exemplary of other uses of the oxidized metals are: use in batteries and fuel cells, as elements in electron emission, as electrolytic rectifiers, capacitors, use in catalysis, in electrochemistry and as a protection of the metal from corrosion and erosion.

An object of the present invention is to provide an improved electrode and methods of making the same which will have properties closely approaching the above-mentioned properties of the ideal reference electrode.

Another object of the invention is to provide new reference electrodes for use in determining the susceptibility of metals to corrosive attack, which electrodes may be installed and used in anodic polarization corrosion control systems by being placed directly in contact with the corrosive electrolyte and without requiring the use of a salt bridge.

A further object of the invention is to provide a method for making certain electrodes which are particularly useful in determining the susceptibility of metals to corrosive attack when in contact with corrosive electrolytes.

An additional object of this invention is to provide a method of coating a metal with an oxide which is several molecular layers thick and tightly adherent to the base metal.

Other objects and advantages of the invention will become apparent upon reading the description of the invention which follows.

According to the present invention, there is provided a method for the preparation of oxides on metals, said method comprising the step of immersing the metal in a molten oxidizing salt, such as an alkali metal nitrate or alkali metal chlorate, making the metal the anode in an electrolytic circuit including the alkali metal salt, and passing sufficient current through the eletcrolytic circuit to form an oxide coating on the metal.

The characteristics of the individual electrodes in various environments and the nature of the anodic system of corrosion prevention are disclosed herein with the aid of illustrative drawings and graphs as outlined below.

Figure 1:
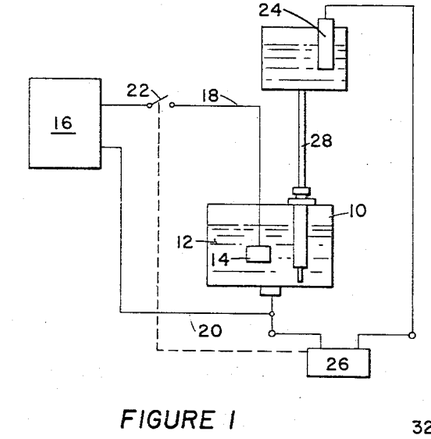
FIGURE 1 is a schematic illustration of a typical anodic polarization corrosion control system.

Referring now to the drawings in detail and particularly to FIGURE 1, a typical anodic polarization corrosion control system generally comprises a metallic vessel 10 or other metallic member which it is desired to protect from the corrosive influence of a corrosive electrolyte 12 which is in contact therewith. The anodic polarization system per se comprises an inert electrode 14 which is suspended in the corrosive electrolyte 12 and which is made a cathode with respect to the metallic vessel 10 which is connected as the anode in a suitable electrical circuit. The electrical circuit which includes the cathode 14 and the vessel 10 comprises a suitable source of direct current 16, electrical leads 18 and 20 connected to the cathode 14 and the vessel 10 respectively, and a suitable switch 22 for opening and closing the electrical circuit.

The control of the closure of switch 22 and consequently the passage of current between the vessel 10 and the inert cathode 14 is effected by means of a reference electrode 24 and suitable control circuitry 26. The reference electrodes which have previously been used have generally required the use of a suitable electrolytic salt bridge, which is designated in FIGURE 1 by reference character 28, in order to place the reference electrodes in electrochemical communication with the corrosive electrolyte in the vessel 10.

As a potential of the metallic vessel 10 is varied with respect to the reference electrode 24 the susceptibility of the vessel to the corrosive attack by the corrosive electrolyte 12 is also varied. An indication of the passivity of the vessel or its immunity to corrosive attack can therefore be determined by observing the variation in the potential difference between the reference electrode 24 and the metallic vessel 10. Since the potential of a properly functioning reference electrode remains essentially constant, variations in the potential difference between this electrode and the vessel 10 will be indicative of a change in the potential of the vessel 10 and hence a change in its susceptibility to corrosive attack. The controller 26 converts the variation in this potential difference to control signals which operate the switch 22 so that current is passed from the electrolyte between the vessel 10 and the inert cathode 14 at such times as may be required to maintain or restore the metal of the vessel 10 to a passive state.

Figure 2:
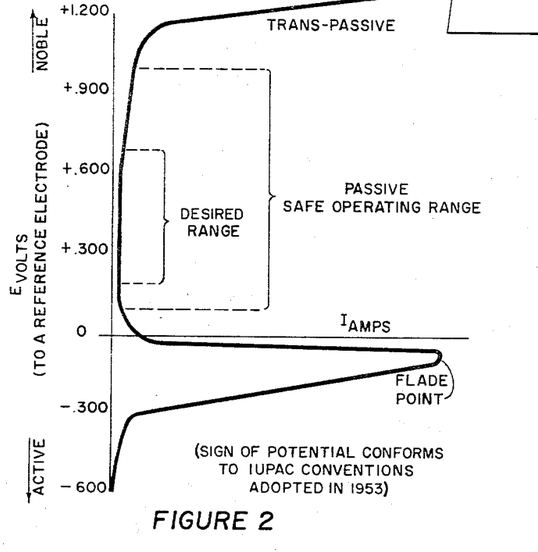
FIGURE 2 is a graph illustrating a typical polarization curve for a metallic vessel to be protected from corrosion by contact with a corrosive electrolyte contained therein.

In FIGURE 2 of the drawings, a typical anodic polarization curve is illustrated. This curve will be characteristic of each particular vessel and electrolyte system which is under the protection of the system. It will be noted that over the range of potentials at which the vessel is passive very little current is required to be passed between the vessel and the inert cathode in order to maintain the vessel at these passive potentials. On the other hand, to pass from an active potential to the range of passivity a large amount of current must be applied to cause the potential to change through the flade point. It should also be noted that most electrolytic systems requiring protection will, as shown in FIGURE 2, have a relatively large range of potential over which the vessel will be passively or relatively inert (noble) with respect to the electrolyte. For this reason, an isothermal potential deviation of ±50 millivolts or more can frequently be tolerated in the reference electrode without the occurrence of detrimental errors in the determination of the time and quantity of current which should be passed.

As previously indicated, it is one of the major objects of the present invention to effect improvement in anodic polarization corrosion control systems of the type illustrated in FIGURE 1 by providing reference electrodes which function in a manner superior to the calomel and silver-silver chloride electrodes which have previously been utilized for this purpose. In order to evaluate the extent to which a number of materials might approach ideality or at least suitability in their ability to function as reference electrodes, a great many materials have been tested by me in a variety of corrosive electrolytes which generally include those most frequently encountered in chemical storage systems of the type where corrosion protection is most essential. The electrolytes which were employed in evaluating possible reference electrode materials were: sulfuric acid, oleum, phosphoric acid, poly-phosphoric acid, pickle liquor, sodium hydroxide, chromic acid and molten sodium hydrogen sulfate. Varying concentrations and temperatures of each of these electrolytes were utilized; and in the case of most of the electrode materials tested, quantities of iron were dissolved in the electrolytes to determine the effect, if any, this material might have upon the constancy of the potential of the material tested as electrodes. The provision of substantial quantities of iron in solution in the electrolytes, in many instances, was effected for the purpose of simulating more closely the conditions actually obtaining in situations where anodic polarization systems are utilized to prevent the corrosion of vessels constructed of ferrous metals.

Figure 3:
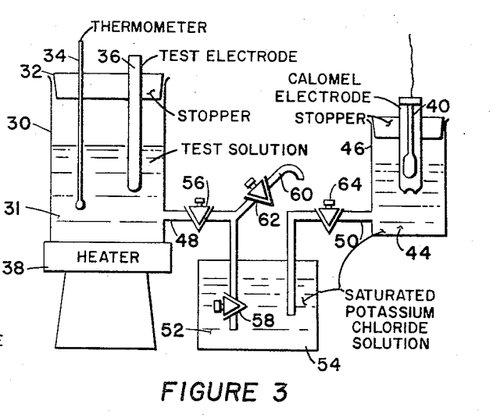
FIGURE 3 is a schematic diagram illustrating the apparatus which I have utilized in observing the stability of the potential of the reference electrodes of the present invention by measuring the potential difference between the electrode under test and a calomel reference half-cell maintained at approximately 25° C.

In order to accurately evaluate the variations in potential of the materials which were tested for suitability as reference electrodes, the testing apparatus illustrated schematically in FIGURE 3 was devised. My previous work prior to design of the apparatus illustrated in FIGURE 3 had shown that the deterioration of agar salt bridges interposed between a corrosive electrolyte and a reference calomel electrode for the protection of the calomel electrode had caused the E.M.F. measured between the material under test and the calomel electrode to drift. The apparatus illustrated in FIGURE 3 virtually eliminates mixing of the salt bridge solution and the corrosive electrolyte being used in the test of the electrode material.

Referring to FIGURE 3, a vessel 30 constructed of glass or other suitably inert material is used to contain a corrosive electrolyte 31 utilized in the test. This vessel is provided with a stopper 32 which carries a thermometer 34 and a test electrode material 36, both of which extend into contact with the corrosive electrolyte solution 31 in the vessel 30. The vessel 30 is placed on a thermostatically controlled heater 38 which facilitates the control variations of the temperature of the corrosive electrolyte. A calomel electrode 40 is placed in communication with a saturated potassium chloride solution 44 contained in a suitable vessel 46. Electrically conductive communication is established between the corrosive electrolyte 31 and a saturated potassium chloride solution 44 in the vessel 46 by means of side arms 48 and 50 extending from the vessels 30 and 46 respectively and communicating with additional saturated potassium chloride solution 52 contained within a third vessel 54. Control of the flow of the corrosive electrolyte in a side arm 48 is achieved by means of stopcocks 56 and 58 and by a vent arm 60 communicating with the side arm 48 and containing a stopcock 62. A stopcock 64 is interposed in the side arm 50 to control the flow of saturated potassium chloride solution between the vessel 46 and the vessel 54. All of the stopcocks are maintained in a grease-free condition. The calomel reference half-cell 40 is maintained at a temperature of approximately 25° C. and the potential difference between the test electrode and the calomel reference half-cell may be measured with a Millivac D.C. Voltmeter (Type MV 17C), a Keithley Electrometer (Type 610A) or other suitable measuring device.

A number of reversible electrodes comprising a metallic base with a metal oxide coating thereon were tested for suitability as reference electrodes in anodic polarization corrosion control systems.

These electrodes were prepared by immersing rods of platinum, rhodium, tantalum, palladium, hafnium, gold, molybdenum, tungsten, chromium, zirconium and niobium individually in a molten salt bath, making the metal the anode in an electrolytic circuit including the alkali metal salt and passing sufficient current through the electrolytic circuit to form an oxide coating on the metal. The oxide coatings were identified either by X-ray or spectrophotometric procedures. The exact temperature of the molten salt was not critical in the formation of the oxide, the only prerequisite being that the salt be in the molten state. The period of time required to form the oxide varied between about 1 and about 5 minutes, the exact time being dependent upon the particular metal being oxidized and the amount of current density applied to the metal. While current densities varying between about 1 and about 50 ma./sq. cm. represent the practical operating range, the exact current density required in any given case depends upon the time such current is applied. When low-current densities are utilized, the time required to form the desired oxide will be longer than when high-current densities are utilized. The rate at which the oxide coating is formed also determines the type of oxide which will be present in any given situation. Where the coating is applied rapidly, the resulting coating is a rather loose and porous structure. Likewise, where the coating is formed slowly, the resulting coating is dense and tightly adherent. The results are presented in Table A.

including the molten salt bath and electric current was passed through the circuit to form an oxide coating on the metal. In the electrodes prepared by this method, the amorphous coating was lusterless and without apparent color. Analytical evidence indicated the presence in the coating of mixed platinum oxides.

Spectrophotometric examination of the oxide films of the platinum-platinum oxide electrode shows that the average film consists of a mixture of PtO and $PtO_2$ in the ratio range of about 3:1 to about 7:1 respectively. The film thickness has been found to vary from about 12 to 157 atomic layers.

Figure 4:
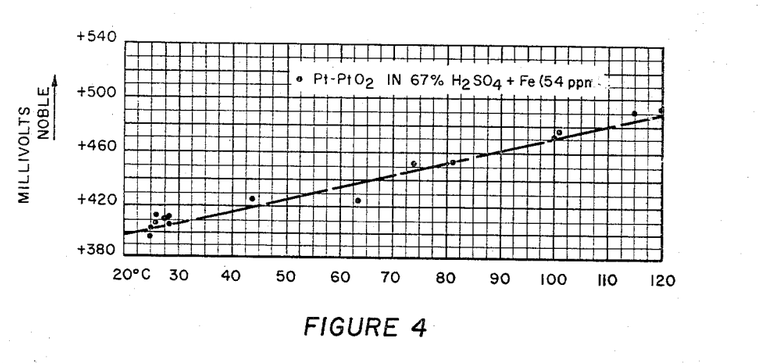
FIGURE 4 is a graph in which potential is plotted against temperature for a platinum-platinum oxide electrode in contact with 67% sulfuric acid.
Figure 5:
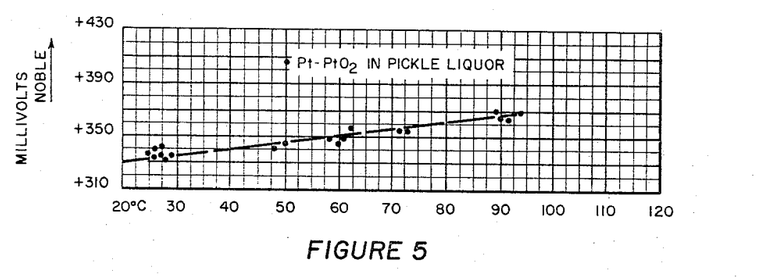
FIGURE 5 is a graph in which potential is plotted against temperature for a platinum-platinum oxide electrode in direct contact with pickle liquor electrolyte.
Figure 7:
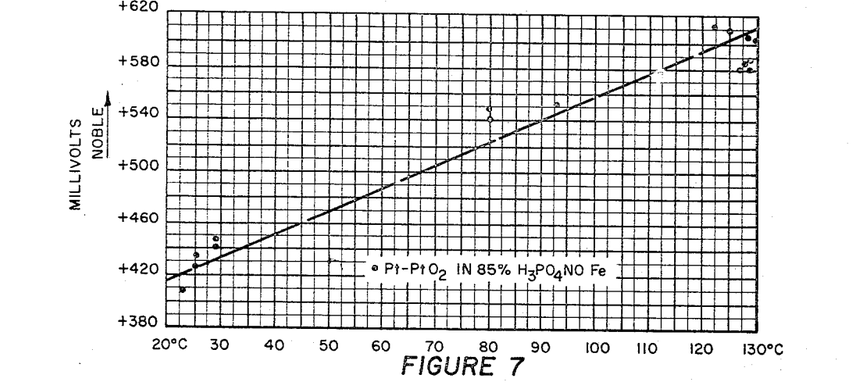
FIGURE 7 is a graph in which potential is plotted against temperature for a platinum-platinum oxide electrode in direct contact with 85% phosphoric acid.
Figure 8:
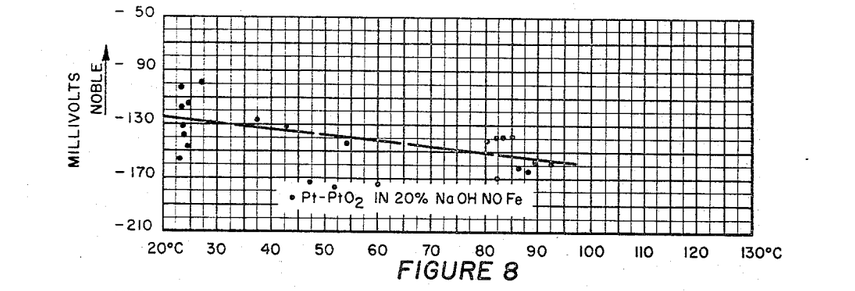
FIGURE 8 is a graph in which potential is plotted against temperature for a platinum-platinum oxide electrode in contact with 20% sodium hydroxide.

In FIGURE 4 the results of potential stability tests of a platinum-platinum oxide electrode in 67% sulfuric acid containing 54 parts per million iron have been portrayed in the form of a graph. The temperature stability of this electrode is seen to be comparable to that of the calomel electrode. The range of measured potential over a temperature range of 100° C. is from about 390 millivolts to 490 millivolts. Despite this slight temperature instability of the platinum-platinum oxide electrode in a sulfuric acid electrolyte containing iron, the many other advantageous qualities of this electrode make it one of the most suitable for use in anodic polarization corrosion control systems; thus, it will be perceived by reference to FIGURE 5 that the platinum-platinum oxide electrode performs well in a sufuric pickle liquor electrolyte. Its mean potential stability is also excellent in 20% sodium hydroxide as indicated in FIGURE 8. The temperature stability of the platinum-platinum oxide electrode in 85% phosphoric acid electrolyte in which no iron was dissolved, while satisfactory, is not as good as the stability of this electrode in other electrolytes in which it was tested. The results of potential measurements made while the electrode was in direct contact with the phosphoric acid electrolyte are portrayed in the graph illustrated in FIGURE 7. It will be noted that the temperature range over which the test was conducted in obtaining the FIGURE 7 data was from about 22° through 130° C.

Figure 9:
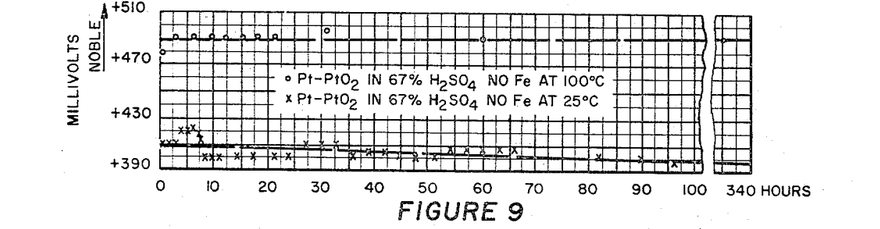
FIGURE 9 is a graph in which potential is plotted against time for platinum-platinum oxide electrodes immersed in sulfuric acid solutions maintained at different temperatures.
Figure 10:
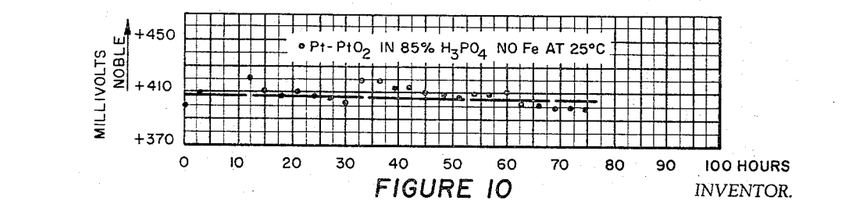
FIGURE 10 is a graph in which potential is plotted against time in order to illustrate the stability of a platinum-platinum oxide electrode in the 85% phosphoric acid over extended periods of time.

In order to evaluate the long-term electrode stability of platinum-platinum oxide electrodes, tests were conducted to evaluate this parameter when the electrode was placed in direct contact with 67% sulfuric acid containing no iron and maintained at 100° C.; 67% sulfuric acid containing no iron and maintained at 25° C.; and 85% phosphoric acid containing no iron and maintained at 25° C. The results of these tests are plotted in the graph shown in FIGURES 9 and 10. It will be noted that in each case the stability of the potential of the electrode in these electrolytes over extended periods of time was excellent, being in every instance as good or better than

TABLE A

| Example | Metal | Molten Salt | Temp., °C. | Current Density, ma./sq. cm. | Time, min. | Appearance | Coating Formed | Analytical Method Used in Analyzing Product |
|---|---|---|---|---|---|---|---|---|
| 1 | Platinum | $KNO_3$ | 400 | 1 | 1 | Dull | Oxide | U.V.[1] |
| 2 | do | $KClO_3$ | 400 | 10 | 1 | do | do | U.V.[1] |
| 3 | do | $NaClO_3$ | 400 | 1 | 1 | do | do | U.V.[1] |
| 4 | Platinum [2] | $KNO_3$ | 400 | 10 | 1 | Dk. gray | do | U.V.[1] |
| 5 | Rhodium | $KNO_3$ | 400 | 1 | 1 | Dull | do | X-ray |
| 6 | do | $KClO_3$ | 400 | 10 | 1 | do | do | Do. |
| 7 | do | $NaClO_3$ | 400 | 1 | 1 | do | do | Do. |
| 8 | Palladium | $KNO_3$ | 400 | 1 | 1 | do | do | Do. |
| 9 | do | $KClO_3$ | 400 | 10 | 1 | do | do | Do. |
| 10 | do | $NaClO_3$ | 400 | 1 | 1 | do | do | Do. |
| 11 | Tantalum | $KNO_3$ | 420 | 2 | 5 | do | do | Do. |
| 12 | Hafnium | $KNO_3$ | 400 | 5 | 1 | do | do | Do. |
| 13 | Gold | $KNO_3$ | 400 | 2 | 1 | do | do | Do. |
| 14 | Molybdenum | $KNO_3$ | 400 | 30 | 1 | Gray | do | Do. |
| 15 | Tungsten | $KNO_3$ | 400 | 20 | 1 | Blue | do | Do. |
| 16 | Chromium | $KNO_3$ | 400 | 20 | 1 | Gray | do | Do. |
| 17 | Zirconium | $KNO_3$ | 400 | 5 | 5 | Dk. gray | do | Do. |
| 18 | Niobium | $KNO_3$ | 400 | 31 | 5 | Silvery-gray | do | Do. |

[1] Beckman DU Spectrophotometer at 230 and 260 mv.
[2] Platinum having a previously applied coating of platinum black deposited thereon.

The preferred method of preparing the platinum-platinum oxide electrode is illustrated in Table A in which a platinum rod was dipped in fused potassium nitrate maintained at a temperature of about 400° C. The platinum was made the anode in an electrolytic circuit the long-term electrode stability of the calomel electrode. In addition to the test of the platinum-platinum oxide electrode which yielded the results plotted in the graph shown in FIGURES 4, 5, 7 and 10, this electrode was also tested to determine the stability of its potential in phosphoric acid solutions in varying concentrations. The results obtained from measurements of the E.M.F. relationship between the platinum-platinum oxide electrode and the reference saturated calomel electrode at approximately 25° C. is tabulated in Table B. It will be seen from the data in this table that the platinum-platinum oxide electrode is relatively insensitive to changes in phosphoric acid concentration and even maintains its potential stability in polyphosphoric acid containing free phosphorus pentoxide.

TABLE B

| Acid concentration percent $H_3PO_4$: | E.M.F. referenced to calomel, in millivolts |
|---|---|
| 85.9 | 365 |
| 96.3 | 340 |
| 115 | 340 |

A test was also conducted to determine the stability of the potential of a platinum-platinum oxide electrode in a chromic acid cleaning mixture of the type commonly employed in cleaning laboratory glassware. This cleaning mixture consisted of 92 grams of sodium dichromate dihydrate, 458 grams of distilled water, and 800 ml. of concentrated sulfuric acid (96%). The time required for the electrode to become stabilized in the chromic acid cleaning mixture was evaluated and the results of this evaluation are tabulated in Table C below.

TABLE C.—PLATINUM-PLATINUM OXIDE ELECTRODE IN CHROMIC ACID CLEANING MIXTURE

| Time, minutes: | E.M.F. referenced to calomel, in millivolts |
|---|---|
| 0 | 1250 |
| 5 | 1300 |
| 22 | 1380 |
| 30 | 1370 |
| 42 | 1370 |
| 102 | 1370 |
| 255 | 1370 |

It will be perceived that the platinum-platinum oxide electrode came readily to a stable E.M.F. value and retained this E.M.F. over an extended period of time. This result confirms the extended time stability of the platinum-platinum oxide electrode observed in the sulfuric acid electrolyte and represented by the graph depicted in FIGURE 9.

In addition to the platinum-platinum oxide electrode, a rhodium-rhodium oxide electrode was prepared in the manner similar to the preparation of the platinum-platinum oxide electrode. A strip of rhodium metal was dipped in a bath of fused potassium nitrate maintained at a temperature of about 400° C. The rhodium was made the anode in an electrolytic circuit including the molten salt bath and electric current was passed through the circuit to form an oxide coating on the metal. The type of oxide whch was formed by this procedure was determined by X-ray defraction to be $Rh_2O_3$.

Upon testing the rhodium-rhodium oxide electrode in sulfuric acid electrolytes of varying temperature and concentration, a behavior substantially identical to that exhibited by the platinum-platinum oxide electrode resulted. Temperature stability of the electrode was very good; however, in the case of both the rhodium-rhodium oxide and platinum-platinum oxide electrodes, the potential of the electrodes remained substantially constant over a range of lower concentrations of the sulfuric acid electrolyte then changed sharply at a concentration of approximately 96% of the acid and then once again assumed stability in concentrations of from approximately 100% to 115% sulfuric acid. These tests of electrode potential stability against sulfuric acid concentration indicate that the rhodium-rhodium oxide and platinum-platinum oxide electrodes can be used to excellent advantage in a corrosive sulfuric acid electrolyte of less than 96% acid concentration or of greater than 100% acid concentration (oleum). Between these two ranges of acid concentration, however, a factor must be introduced to compensate for the change in electrode potential with changes in acid concentration. A preferred use of these two noble metal oxide electrodes would therefore appear to be in oleum service and sulfuric acid service where the concentration of the sulfuric acid is less than 96%.

Figure 6:
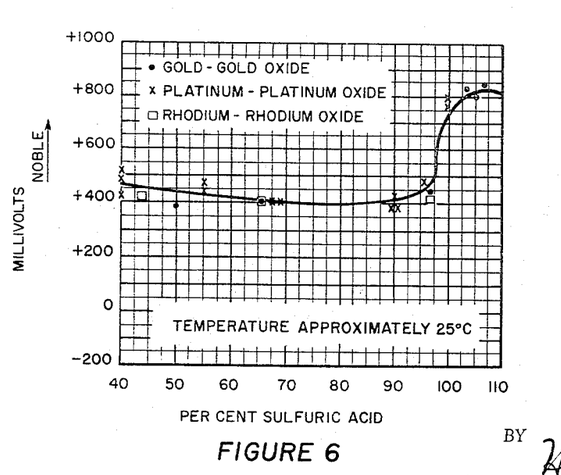
FIGURE 6 is a graph in which potential is plotted against acid concentration for certain noble metal oxide electrodes when in contact with a sulfuric acid electrolyte maintained at 25° C.

In addition tot he electrodes made from noble metals rhodium and platinum, a gold-gold oxide electrode was also fabricated in a similar manner and appeared to possess electrode characteristics quite similar to that of the rhodium-rhodium oxide and platinum-platinum oxide electrodes. Thus, in FIGURE 6, it may be observed that the potential of the gold-gold oxide electrode also is quite stable for sulfuric acid or oleum concentrations of less than 96% and greater than 100% respectively. The stability of the gold-gold oxide in oleum is evidenced by the data tabulated in Table D.

TABLE D

| Oleum Concentration | | E.M.F. Referenced to Calomel, in Millivolts |
|---|---|---|
| Percent $H_2SO_4$ | Percent Free $SO_3$ | |
| 103.4–104.1 | 15.0–18.0 | 820 |
| 104.5–105.2 | 20.0–23.0 | 800 |
| 106.8–107.4 | 30.0–33.0 | 840 |

It is apparent that the electrode maintains a substantially constant potential as the percentage of free sulfur trioxide in the oleum electrolyte is varied between 15% and 33%. This stability of the noble metal oxide electrode in oleum solutions is especially desirable in view of the widespread use of this electrolyte in various chemical manufacturing and processing industries.

One of the most desirable characteristics of the gold-gold oxide electrode is its ability to become readily stabilized in most of the electrolytes in which it was tested. In this respect the gold-gold oxide electrode was superior to either the platinum-platinum oxide electrode or the rhodium-rhodium oxide electrode. Typical data showing the effect of aging on the potential of the gold-gold oxide electrode are tabulated in Table E which shows the effect of maintaining the electrode in contact with an oleum electrolyte containing from 30% to 33% free sulfur trioxide over a period of 24 hours.

TABLE E

| Time, hours: | E.M.F. referenced to calomel, in millivolts |
|---|---|
| 0.25 | 830 |
| 4.75 | 830 |
| 8.25 | 850 |
| 24.0 | 840 |

The data taubulated in Table E indicate that within 15 minutes of its being placed in contact with the oleum electrolyte the gold-gold oxide electrode has attained the potential which it will then maintain for the next 24 hours. The excellent stabilization rate of this electrode is believed to be superior to the rate of stabilization of any of the other materials tested and found to be suitable for use as reference electrodes. In tests of the gold-gold oxide electrode in a phosphoric acid electrolyte, the electrode demonstrated very little potential fluctuation as the concentration of the phosphoric acid was varied. The results of these tests are tabulated in Table F.

TABLE F

| Acid concentration percent $H_3PO_4$: | E.M.F. referenced to calomel, in millivolts |
|---|---|
| 85.9 | 80 |
| 96.3 | 100 |
| 115 | 100 |

The results which are set forth in Table F represent only approximate E.M.F. values obtained for the gold-gold oxide electrode because of the small size of the electrode used; however, the data are considered sufficiently accurate to show that the electrode potential is essentially independent of the concentration of the phosphoric acid electrolyte.

Like the platinum-platinum oxide electrode the gold-gold oxide electrode was also tested for potential stability over extended periods of time when placed in contact with a chromic acid cleaning mixture. The composition of the mixture was the same as that described above in connection with the description of the platinum-platinum oxide tests. The data obtained in conducting this test are tabulated in Table G.

TABLE G

| Time, minutes: | E.M.F. referenced to calomel, in millivolts |
|---|---|
| 0 | 1360 |
| 5 | 1380 |
| 20 | 1370 |
| 40 | 1370 |
| 99 | 1370 |
| 253 | 1370 |

It is again apparent that the gold-gold oxide rapidly attains, and then continues to maintain, an excellent stability over extended periods of time.

Another extremely desirable property of the noble metal oxide electrodes which should be mentioned is their complete immunity to attack by the corrosive electrolytes which were utilized. No tendency towards solubility in the electrolytes was observed.

In addition to their usefulness in sulfuric acid, phosphoric acid, and chromic acid, the noble metal oxide electrodes were found to be useful reference electrodes in a system used to protect metallic vessels from corrosive attack by molten salt solutions and particularly molten acid salts such as sodium hydrogen sulfate. Since substantially all of the water is normally driven off of the salts in the molten state, no problem of variation of electrode potential with electrolyte concentration is encountered in this application.

Figure 11:
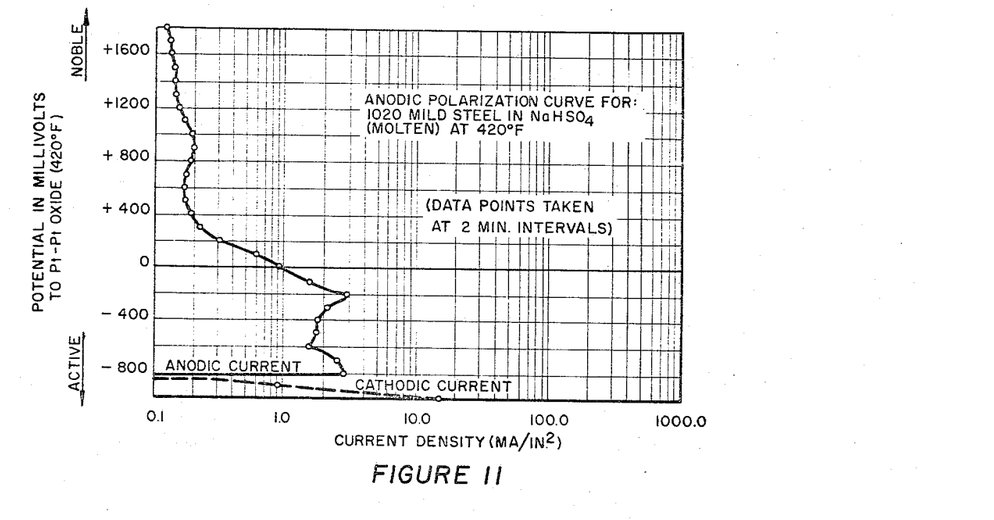
FIGURE 11 is a graph showing a polarization curve for 1020 mild steel in contact with molten sodium hydrogen sulfate and using a platinum-platinum oxide reference electrode.
Figure 12:
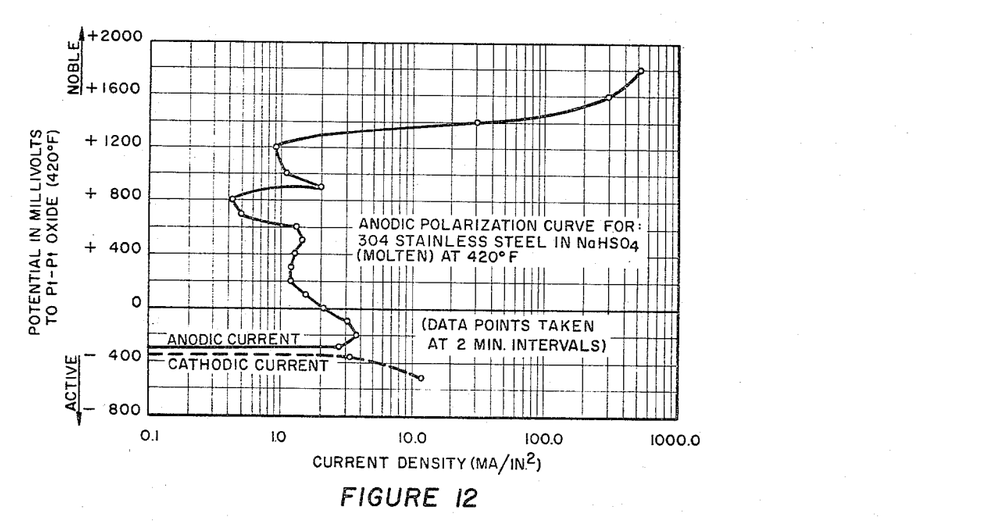
FIGURE 12 is a graph showing a polarization curve for 304 stainless steel in contact with molten sodium hydrogen sulfate and using a platinum-platinum oxide reference electrode.

Because of the high temperatures encountered in the use of anodic polarization systems to protect metals against attack by molten salts, it is not possible to evaluate the stability of the noble metal-noble metal oxide electrodes by comparison with the standard calomel electrode. At the temperatures at which many salts are molten, the salt bridge electrolyte solution would be caused to boil. However, polariaztion curve and corrosion test data obtained using the platinum-platinum oxide electrode as the reference electrode clearly indicate the suitability of the noble metal-noble metal oxide electrodes for this use. Thus, in FIGURES 11 and 12, the polarization curves for 1020 mild steel and for 304 stainless steel in contact with molten sodium hydrogen sulfate and using a platinum-platinum oxide reference electrode each indicate the existance of a passive potential region of minimum current density.

Table H shows the corrosion rates of both unprotected and anodically polarized 1020 mild steel and 304 stainless steel coupons in molten sodium hydrogen sulfate at 420° F. The platinum-platinum oxide electrode was used as the reference electrode in an anodic polarization corrosion control system of the type herein before described and illustrated in FIGURE 1.

milli-inches per year or 93.3%. These results clearly demonstrate the effectiveness of the noble metal-noble metal oxide electrodes as reference electrodes for use in anodic polarization corrosion control systems for protecting steel vessels against corrosion by molten salts.

Another type of metal-metal oxide electrode was proved, by the test which I have conducted, to possess properties indicating its suitability for use as a reference electrode in the anodic polarization corrosion control systems. This was a molybdenum-molybdenum oxide electrode. In a test of this material the E.M.F. relationship between the molybdenum-molybdenum oxide electrode and a saturated calomel reference electrode maintained at 25° C. was determined while the molybdenum-molybdenum oxide electrode was in contact with phosphoric acid solutions of different concentrations. As shown by Table I below, the E.M.F. of this electrode with respect to calomel is suitably independent of the strength of the phosphoric acid solution as the acid concentration is varied from 85% to 115%.

TABLE I

| Acid concentration percent $H_3PO_4$: | E.M.F. referenced to calomel, in millivolts |
|---|---|
| 85.9 | 160 |
| 96.3 | 190 |
| 115.0 | 220 |

The molybdenum-molybdenum oxide electrode was also evaluated for its ability to quickly attain equilibrium and to maintain its stability over an extended period of time. Typical data showing the effect of aging on the potential the molybdenum-molybdenum oxide electrode are tabulated in Table J. The tests were conducted with the electrode in contact with a 115% phosphoric acid solution maintained at 25° C.

TABLE J

| Time, hours: | E.M.F. referenced to calomel, in millivolts |
|---|---|
| 0 | 190 |
| ½ | 200 |
| 2 | 210 |
| 3 | 220 |
| 4 | 220 |
| 5½ | 220 |
| 22½ | 220 |

As indicated by the data set forth in Table J, the molybdenum-molybdenum oxide electrode attains equilibrium rapidly and maintains a relatively constant potential over extended periods of time. In the test of extended stability, which was conducted, it was also observed that this electrode is not appreciably attacked by the phosphoric acid solutions ranging in concentration from 86% to 115%.

A chromimum-chromium oxide electrode was also prepared in the manner previously disclosed. This electrode is very useful in caustic solutions. Table K shows the stability of the chromium-chromium oxide electrode in 50% sodium hydroxide solution when the solution was heated

TABLE H

| Type Metal | Liquid Phase [1] Corrosion Rate, m.p.y. | | Polarization [2] Potential, mv. | Current [3] Density, ma./sq. ft. | Percent Protection |
|---|---|---|---|---|---|
| | Unprotected | Anodically Polarized | | | |
| 1020 mild steel | 924 | 4.0 | +600 (noble) | 5.8 | 99.6 |
| Do | | 2.3 | +750 (noble) | 4.4 | 99.8 |
| 304 stainless steel | 81 | 5.4 | +750 (noble) | 9.6 | 93.3 |

[1] Approximately 20-hour tests.
[2] Pt-PtO reference electrode (420° F.).
[3] For maintaining polarization near close of test.

In referring to Table H it will be noted that anodic protection reduced the liquid phase corrosion rate of mild steel from 924 to 2.3 milli-inches per year or 99.8%, and reduced the corrosion rate of stainless steel from 81 to 5.4 to 100° C. It should also be noted that the chromium-chromium oxide was not visibly attacked by this concentrated sodium hydroxide solution, even at the elevated temperatures.

TABLE K.—EFFECT OF TEMPERATURE ON E.M.F. OF CHROMIUM-CHROMIUM OXIDE

| Temperature, °C. | E.M.F., mv.[1] | Time, Hours |
|---|---|---|
| 23 | [2]+545 | 11 |
| 23 | +520 | 23 |
| 30 | +525 | 31 |
| 40 | +530 | 23½ |
| 50 | +540 | 23¾ |
| 60 | +550 | 23½ |
| 70 | +570 | 23½ |
| 80 | +600 | 23⅔ |
| 90 | +635 | 23¾ |
| 100 | +690 | 24 |
| 27 | +540 | 27½ |

[1] To saturated calomel at approximately 25° C.
[2] Active.

A tungsten-tungsten oxide electrode was prepared in the manner as previously disclosed. This electrode was then tested in a 50% sodium hydroxide solution and the temperature was varied over a period of time. The results are shown in Table L.

TABLE L.—EFFECT OF TEMPERATURE ON E.M.F. OF TUNGSTEN-TUNGSTEN OXIDE ELECTRODE IN 50 PERCENT CAUSTIC

| Temperature, °C. | E.M.F., mv.[1] | Time, hours |
|---|---|---|
| 135 | [2]−1,120 | 0 |
| 130 | −1,120 | |
| 115 | −1,140 | |
| 110 | −1,125 | |
| 105 | −1,125 | |
| 100 | −1,125 | |
| 90 | −1,120 | |
| 80 | −1,125 | |
| 70 | −1,100 | |
| 60 | −1,100 | |
| 50 | −1,100 | |
| 45 | −1,040 | |
| 40 | −1,010 | |
| 27 | −1,020 | 3½ |
| 27 | −950 | 45 |

[1] To saturated calomel at approximately 25° C.
[2] Active.

These data show: (1) the E.M.F. was essentially constant at minus 1120 millivolts (nobble) throughout the temperature range 50 to 135° C.; (2) the E.M.F. varied slightly at 27° C. (minus 950 to minus 1020 millivolts); and (3) the E.M.F. shifted only to minus 1120 millivolts as the temperature was increased from 27° C. to 50° C.; thus, the electrode E.M.F. is reasonably stable at room temperature, shifts only slightly as the temperature is increased and is essentially constant over a wide range of elevated temperatures.

A hafnium-hafnium oxide electrode was prepared in the manner previously described and this electrode was tested in a 50% sodium hydroxide solution, over a temperature range of 25 to 80° C., and found to perform in a very satisfactory manner.

Tantalum metal was oxidized according to the method of this invention and the oxide formed was determined by X-ray to be the beta-tantalum oxide. This electrode was then tested in a 50% sodium hydroxide solution over a temperature range varying from 25 to 95° C. and found to be a suitable reference electrode.

A nickel-nickel oxide electrode, prepared by the method of this invention, gives a reference electrode suitable for use in strong caustic solution.

In addition to the metal oxides previously disclosed, the oxides of manganese, cobalt, and scandium are included within the scope of this invention.

From the foregoing working examples, it will be perceived that I have extensively tested and evaluated a great number of materials to determine their suitability for use as reference electrodes. While these tests and evaluation have been directed primarily to the determination of materials which possess properties which endow them with superior attributes when utilized as reference electrodes in anodic polarization corrosion control systems, it will be apparent that many of the same properties which characterize reference electrode in such corrosion control applications also must characterize any reference electrode when employed in an application or use which requires it to be placed in contact with a corrosion electrolyte. The solid nature of many of the materials which have proved suitable for such use enables them to be usefully employed in applications where substantial mechanical strength and ease of installation are important factors. Moreover, the excellent temperature and concentration stability of most of the electrodes discussed herein before indicates that they possess the properties which are most essential in various analytical techniques where a reference electrode of constant potential is required.

Many of the electrode materials which were tested and which were believed to be sufficiently good materials for use as reference electrodes appeared to retain their attractive properties in both acidic and basic electrolytes of varying types and concentrations. Others of the electrodes showed definitely better stability in some of the electrolytes than in others. In the relatively few instances where the materials did not exhibit a constant potential over the entire concentration range of the electrolytes in which they were tested, a very good stability of these electrodes within certain specific ranges may be advantageously utilized in a corrosion control situation where the range over which the corrosive electrolyte may vary is known in advance. It is believed that the preferred application of the several electrodes will be manifest from the foregoing description of the invention and that it is unnecessary to here summarize the properties of the several electrodes which make one electrode or one group of electrodes preferable for use in certain electrolytes or in certain concentrations of electrolytes and other electrodes or groups of electrodes preferable for general and widespread usage where the concentration temperatures and chemical constitution of the electrolytes are not known with certainty in advance of the installation of the corrosion control system.

In describing the preparation of the metal oxides of this invention by way of examples, certain temperatures, times and current densities were given. It must be understood that the exact temperature of the molten salt is not critical in the formation of the oxides, the only prerequisite being that the salt be in the molten state. The period of time required to form the oxide varied between about 1 and about 5 minutes, the exact time being dependent upon the particular metal being oxidized and the amount of current density applied to the metal. While current densities varying between about 1 and about 50 ma./sq. cm. and represent the practical operating range, the exact current density required in any given case depends upon the time such current is applied. When low current densities are utilized, the time required to form the desired oxide will be longer than when high current densities are utilized. The rate at which the oxide coating is formed also determines the type of oxide which will be present in any given situation. Where the coating is applied rapidly the resulting coating is a rather loose and porous structure. Likewise, where the coating is formed slowly the resulting coating is dense and tightly adherent. Also, in setting forth the practical range of current densities it must be understood that these current densities are those present at the initial current flow. As the oxide is formed on the metal, the current is inherently reduced due to the limited conductivity of the oxide coating.

Although a wide variety of applications and usages of the electrode materials which I have for the first time evaluated for use as reference electrodes will occur to electrochemists and others skilled in the art, it is my intention that the novel principles and concepts herein disclosed shall be the criteria establishing the bounds and limits of the present invention. Insofar as minor modifications and innovations are evolved by those skilled in the art for making further use of the novel principles and concepts herein disclosed, it is my intention that such modifications and innovations be considered to fall within the sphere and scope of this invention except insofar

What is claimed is:
1. A method of putting an oxide coating on metallic nickel comprising:
   (a) immersing the metallic nickel in a molten salt consisting essentially of one salt selected from the group consisting of alkali metal nitrates and alkali metal chlorates;
   (b) making the metallic nickel the anode in an electrolytic circuit including the alkali metal salt; and
   (c) passing sufficient current through said electrolytic circuit to provide a current density between about 1 to about 50 ma./sq. cm.

2. A method of putting an oxide coating on platinum having a previously applied coating of platinum black deposited thereon comprising:
   (a) immersing said platinum in a molten salt consisting essentially of one salt selected from the group consisting of alkali metal nitrates and alkali metal chlorates;
   (b) making said platinum the anode in an electrolytic circuit including the alkali metal salt; and
   (c) passing sufficient current through said electrolytic circuit to provide a current density between about 1 to about 50 ma./sq. cm.

References Cited

UNITED STATES PATENTS 2,822,606 2/1958 Yoshida.
3,239,436 3/1966 Hagiwara et al. ____ 204—39 X

FOREIGN PATENTS 14,468 9/1962 Japan.

OTHER REFERENCES

Poggendorf Annalen, vol. 72, pp. 481–485, Leipzig, 1847.

HOWARD S. WILLIAMS, *Primary Examiner.*
JOHN H. MACK, *Examiner.*
G. KAPLAN, *Assistant Examiner.*